US00RE49089E

(19) United States
(12) Reissued Patent
Mowshowitz

(10) Patent Number: US RE49,089 E
(45) Date of Reissued Patent: May 31, 2022

(54) SECURITY FOR WAP SERVERS

(71) Applicant: F5 Networks, Inc., Seattle, WA (US)

(72) Inventor: David Mowshowitz, Tel Aviv (IL)

(73) Assignee: F5 Networks, Inc., Seattle, WA (US)

(21) Appl. No.: 16/785,195

(22) Filed: Feb. 7, 2020

Related U.S. Patent Documents

Reissue of:
(64) Patent No.: 9,003,509
Issued: Apr. 7, 2015
Appl. No.: 12/332,267
Filed: Dec. 10, 2008

U.S. Applications:
(60) Division of application No. 15/482,681, filed on Apr. 7, 2017, now Pat. No. Re. 48,382, which is an (Continued)

(51) Int. Cl.
*G06F 7/04* (2006.01)
*G06F 21/31* (2013.01)
*H04L 9/40* (2022.01)

(52) U.S. Cl.
CPC ..... *G06F 21/31* (2013.01); *H04L 63/1408* (2013.01); *H04L 63/1433* (2013.01); *H04L 63/04* (2013.01)

(58) Field of Classification Search
CPC . H04L 63/04; H04L 63/1408; H04L 63/1433; G06F 21/31

(Continued)

(56) References Cited

U.S. PATENT DOCUMENTS 5,867,495 A * 2/1999 Elliott et al. ..... 370/352
5,930,792 A 7/1999 Polcyn (Continued)

FOREIGN PATENT DOCUMENTS

WO WO0239286 * 5/2002

OTHER PUBLICATIONS

Bilal Siddiqui, "Deploying Web services with WSDL: Part 1", Nov. 2001.

(Continued)

*Primary Examiner* — Matthew E Heneghan
(74) *Attorney, Agent, or Firm* — John W. Branch; Branch Partners PLLC

(57) ABSTRACT

A method and system for improving the security and control of internet/network web application processes, such as web applications. The invention enables validation of requests from web clients before the request reaches a web application server. Incoming web client requests are compared to an application model that may include an allowed navigation path within an underlying web application. Requests inconsistent with the application model are blocked before reaching the application server. The invention may also verify that application state data sent to application servers has not been inappropriately modified. Furthermore, the invention enables application models to be automatically generated by employing, for example, a web crawler to probe target applications. Once a preliminary application model is generated it can be operated in a training mode. An administrator may tune the application model by adding a request that was incorrectly marked as non-compliant to the application model.

16 Claims, 14 Drawing Sheets

System Overview

Related U.S. Application Data application for the reissue of Pat. No. 9,003,509, which is a continuation of application No. 10/915,951, filed on Aug. 11, 2004, now Pat. No. 7,472,413.

(60) Provisional application No. 60/493,790, filed on Aug. 11, 2003.

(58) Field of Classification Search
USPC ..... 713/156; 726/10
See application file for complete search history.

(56) References Cited

U.S. PATENT DOCUMENTS 5,996,011 A * 11/1999 Humes ..... 709/225
6,006,264 A * 12/1999 Colby ..... H04L 29/06 709/220
6,098,093 A 8/2000 Bayeh et al.
6,182,142 B1 * 1/2001 Win et al. ..... 709/229
6,311,278 B1 10/2001 Raanan et al.
6,360,254 B1 * 3/2002 Linden et al. ..... 709/219
7,146,422 B1 12/2006 Marlatt et al.
7,322,040 B1 * 1/2008 Olson et al. ..... 726/8
2001/0039587 A1 * 11/2001 Uhler et al. ..... 709/229
2002/0023090 A1 2/2002 McGeachie
2002/0069366 A1 * 6/2002 Schoettger ..... 713/201
2003/0069975 A1 * 4/2003 Abjanic ..... H04L 67/2823 709/227
2003/0126558 A1 7/2003 Griffin
2003/0229780 A1 12/2003 Reamer
2005/0050010 A1 * 3/2005 Linden ..... 707/3
2008/0115200 A1 * 5/2008 Olson et al. ..... 726/6

OTHER PUBLICATIONS

Bilal Siddiqui, "Deploying Web services with WSDL, Part 2: Simple Object Access Protocol (SOAP)", Mar. 2002.

* cited by examiner

System Overview

Model Generation via Web Crawler

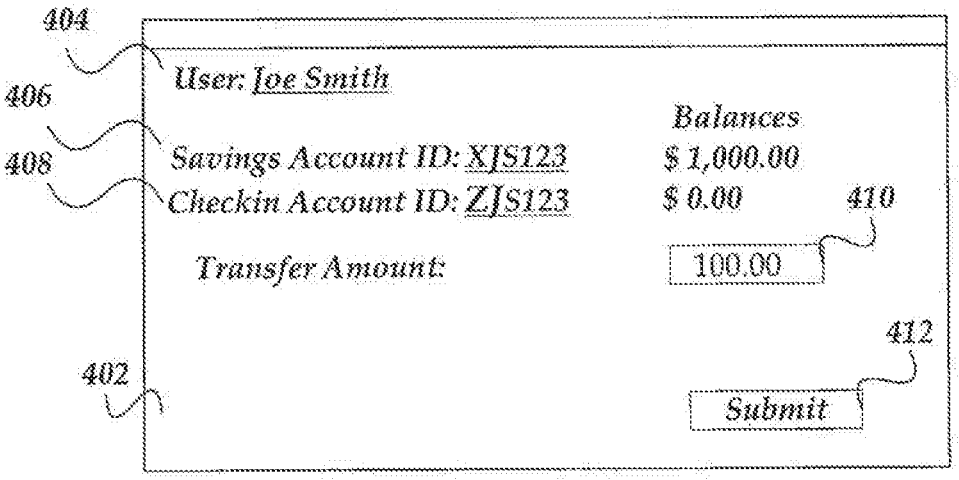

FIG. 4A

414

416

```
<form method='post' action='transfer.html' />
...
<input type='hidden' name='state' value='Gx12sk87y' />
<input type='hidden' name='userID' value='JS199' />
<input type='hidden' name='savAcctID' value='XJS123' />
<input type='hidden' name='chkAcctID' value='ZJS123' />
<input type='text' name='trxAmount' value='100.00' />
...
<input type='submit' name='Submit' value='Submit' />
```

418

420

FIG. 4B

422

424

```
HTTP POST 'http://www.abank.com/transfer.html'
....
state='Gx12sk87y'
userID='JS199'
savAcctID='XJ123'
chkAcctID='ZJS123'
trxAmount='100.00'
....
```

426

HTTP FORM REQUEST

FIG. 4C

Security Mode

Preliminary Model Generation using Web Crawler

Security Mode Web Client Request

1200

| Encrypted Identification Token (1202) | Web Application State Information (1204) |
|---|---|
| 01Abx07sHd4W (1206) | ...<br>userID=JS199<br>savAcctID=XJS123<br>chkAcctID=ZJS123<br>trxAmount=[], money<br>... (1208) |
| 2aGBx12K8lW (1210) | ...<br>userID=XF203<br>savAcctID=XXF203<br>chkAcctID=ZXF203<br>trxAmount=[], money<br>... (1212) |

Web Application State Table

FIG. 12

HTTP RESPONSE

SECURITY FOR WAP SERVERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application] *The present application is a Reissue Divisional of U.S. patent application Ser. No. 15/482,681 filed on Apr. 7, 2017, and is also a Reissue application of U.S. Pat. No. 9,003,509. U.S. patent application Ser. No. 15/482,681 filed on Apr. 7, 2017, is a Reissue application of U.S. Pat. No. 9,003,509. U.S. patent application Ser. No. 12/332,267 filed on Dec. 10, 2008, issued as U.S. Pat. No. 9,003,509 on Apr. 7, 2015. U.S. patent application Ser. No. 12/332,267 filed on Dec. 10, 2008,* is a continuation application of U.S. patent application Ser. No. 10/915,951 filed on Aug. 11, 2004 entitled "Improved Security for WAP Servers," which claims the benefit of U.S. Provisional Application, titled "Improved Security for WAP Servers," Ser. No. 60/493,790 filed on Aug. 11, 2003, the benefits of the filing dates of which are hereby claimed under 35 U.S.C. §§119(e) and 120, and which are each further incorporated herein by reference in their entirety.

FIELD OF THE INVENTION

The present invention relates generally to computing software and systems for managing internet website and web application security and for preventing website and web application users from causing harm.

BACKGROUND OF THE INVENTION

The internet has enabled the deployment of complex web applications that organizations employ to offer location transparent services. Customers of organizations that employ web applications benefit from the convenience of accessing needed services without leaving their homes or offices.

However, deploying complex web applications has also provided opportunities for malicious hackers to create havoc. Hackers can cause severe damage to both the infrastructure and goodwill of the target organizations by exploiting web applications. For example, hackers have been know to exploit web applications to steal user information, including credit card data, bank account information, retirement plan data, and the like. Furthermore, as the number of web applications increase the threat posed by hackers will increase.

In response to hackers, organizations employ a variety of methods, systems, and protocols, in an attempt the limit the damage that hackers can do to their applications. Much of this effort has been oriented towards preventing external attackers from breaking into the web application and its parent computer system. However, attacks from "insiders" are also very common. These "insiders" are persons with malicious intentions who have genuine accounts which give them access to target web applications. Similarly, once an "outside" hacker breaks into a web application the hacker often takes on the appearance of a bona-fide customer.

"Insider" attacks can be difficult for organizations to defend against because aggressive internal security procedures may alienate valuable customers.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings wherein:

FIGS. 4A, 4B, and 4C illustrates an example a web page;

FIG. 12 is one embodiment of a table showing application state information;

DETAILED DESCRIPTION OF THE INVENTION

Figure 1:
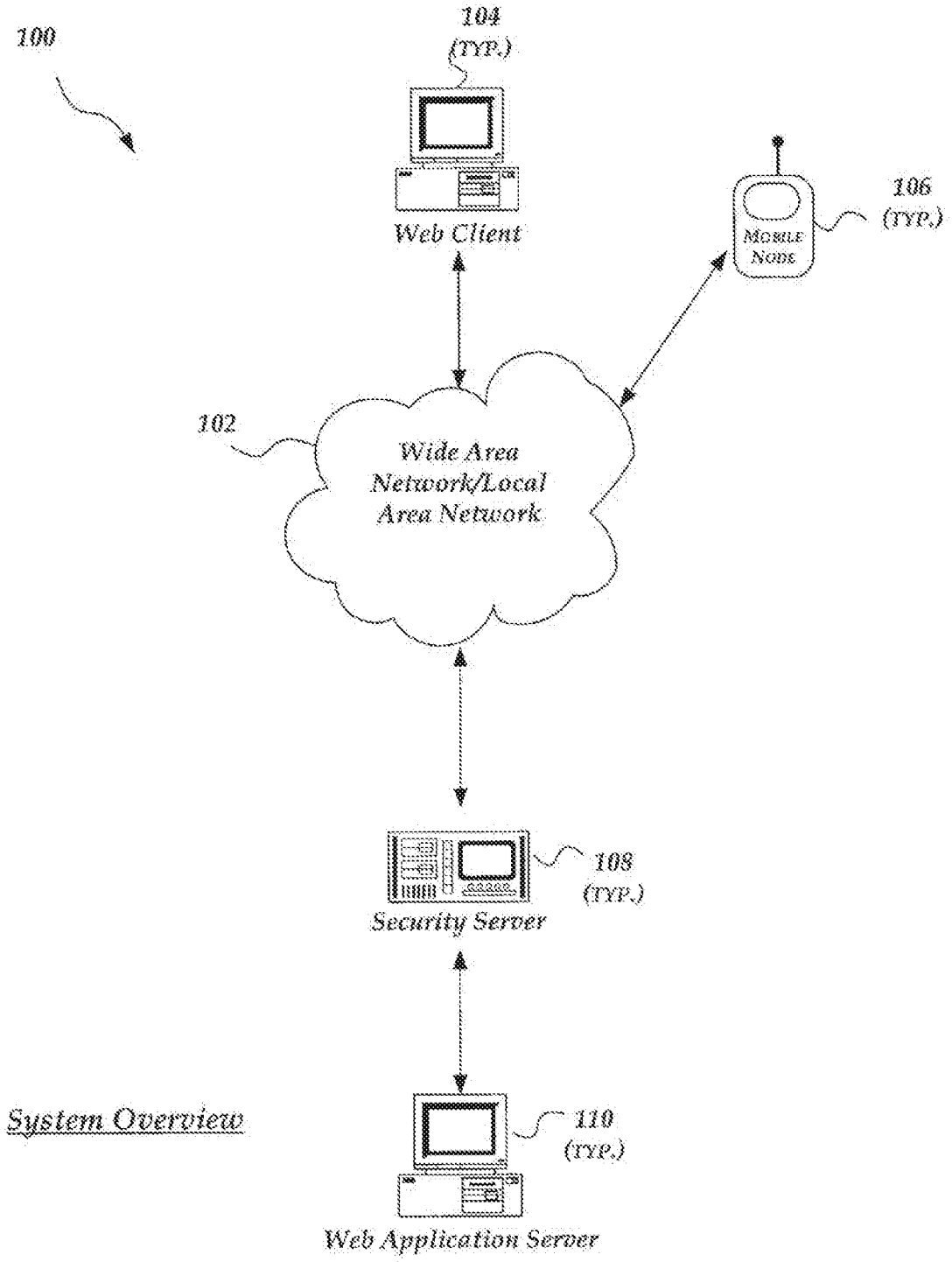
FIG. 1 illustrates one embodiment of a system overview in which the invention may be practiced.

The present invention now will be described more fully hereinafter with reference to the accompanying drawings, which form a part hereof, and which show, by way of illustration, specific exemplary embodiments by which the invention may be practiced. This invention may, however, may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

"WAP," in this specification, is defined as meaning, "web application process." "WAP" is not intended to be limited to "wireless application protocol." A "web application process" is equivalent to a "web application" which may be deployed on a "web application server."

Briefly stated, the present invention is a method and system for improving the security and control of internet/network web application processes, such as web applications. The invention enables the validation of requests from web clients before the request reaches the web application server. An embodiment can compare incoming web client requests to an application model that represents the allowed navigation paths within the underlying web application. Accordingly, requests inconsistent with the application model may be blocked before reaching the web application server.

In addition to validating the navigation of clients within applications, the invention may verify that application state data sent to application servers has not been inappropriately modified by a client. An embodiment may record application state data transmitted to the client in order to verify that this data is not inappropriately altered in subsequent client requests. This aspect of the invention may be especially useful for improving the security of web applications because application state data is routinely sent to web clients where it can be vulnerable.

Furthermore, the present invention enables application models to be automatically generated by employing web crawlers, and similar applications, to probe a target application. Once a preliminary application model has been generated, the invention can be operated in a training mode, which enables the new model to be tested and verified. Accordingly, the invention enables an administrator to review a collection of non-compliant requests in order to tune the application model. Administrators may, for example, tune the application model by adding requests that were incorrectly marked as non-compliant, to the application model.

An embodiment of the invention may be employed for improving security and control of internet/network applications including, but not limited to, web application processes, web applications, web services, web pages, wireless application protocol services, MMS applications, service-oriented architecture (SOA), XML, RPC, SOAP, and the like.

An embodiment of the present invention can automatically generate an application model of the target application. One embodiment may use a "web crawler" to automatically survey and process the target application. The invention may generate an application model by examining and recording the web crawler's HTTP requests and monitoring and recording the web application's HTTP responses. As the web crawler probes each web page and web service of the target application, an application model representing valid interconnections and allowable input and output parameters may be developed.

In one embodiment of the invention, HTTP requests from users are intercepted and compared against the application model. The user's activity may be validated by referring to the application model and an application state database. From this information an embodiment may determine if the current incoming HTTP request is compliant with the active application model. The invention may compare the incoming request with the current list of allowable compliant requests for the user's current state in the application. At least one embodiment of the invention enables HTTP request field values to be examined to ensure that they are compliant with the application model and application state. In general, the present invention may operate to prevent unauthorized adding, removing, or altering of application field values.

For example, it is common for web applications to employ hidden field values to maintain application state information. These hidden field values are submitted back to the web application when the user sends a HTTP request. The web application may then depend on this data to reconstruct the user's application state. However, this method of relying on data from a user's web client to determine application state has at least two problems: (1) it is not difficult for web application users to visually inspect hidden fields using a "view source" function in their web clients; and (2), some web clients, or customized web user-agents, can be employed to inappropriately alter the values of data fields when sending a request back to the web application.

At least one embodiment of the invention can be employed to record and monitor the outgoing and incoming field values for a web application. The present invention enables altered, added, and removed fields to be detected before the HTTP request reaches the web application server. At least one embodiment of the invention enables non-compliant requests to be blocked.

At least one embodiment of the invention records the values of the hidden fields as they are sent to the user's web client. The invention may record the hidden values in a database indexed with an encrypted state token. This encrypted state token may be stored in a HTTP cookie or injected into the HTTP response using a variety of mechanisms. If the user submits data back to the web application, the encrypted state token may be sent back to the web application server along with the HTTP request. The expected values for the hidden fields, associated with the user's HTTP request, can be retrieved using the encrypted state token. If the hidden values in the incoming submitted HTTP request are not compliant with the hidden data values retrieved from the application state database, the incoming request may be blocked before it reaches the web application server(s).

At least one embodiment of the invention records values of certain visible fields as they are sent to the user's web client. For example, a list of valid account number choices may be sent from the web application to the web client. If the user selects one of the account number choices and submits the request back to the web application the present invention is employed to verify that the user selected one of the allowed account number. This may prevent a malicious user from substituting an unauthorized value other than the ones that were originally sent to the user. If the field values included within the incoming submitted request are not compliant with the recorded data values the incoming request may be blocked before it reaches the web application server(s).

At least one embodiment of the present invention can be deployed in a "training mode." Once an application model has been generated it can be tested by operating the present invention in the "training mode." If in "training mode," the invention may continue to monitor incoming and outgoing requests; however, it might not block non-compliant requests. In contrast to operating in secure mode, the invention, while operating in training mode, may allow non-compliant requests to pass-through to the web application unmodified. Non-compliant requests encountered while operating in training mode may be recorded in a non-compliant request queue.

At least one embodiment of the invention enables an administrator to review the non-compliant requests that were detected while operating in training mode. If the administrator determines that a request was found to be non-compliant because, for example, the application model was incomplete, then the administrator can modify the request to the application model. This enables the administrator, at least, to fine tune the application model, correct for mistakes made when the web crawler automatically generated the application model, and perform similar modifications.

At least one embodiment of the invention enables the invention to be deployed as a standalone network device that is employed to monitor incoming requests and outgoing responses for, at least, one web application server.

At least another embodiment of the invention may practice the invention as part of a single integrated network device wherein the network device performs a multitude of network services in addition to the claimed invention. In this configuration, the invention operates as a number of processes and programs on a network device computer that is, at least, monitoring the inbound requests and outbound responses for, at least, one web application server.

Exemplary Operating Environments

FIG. 1 illustrates an overview 100 of an environment in which the invention operates and in which multiple web clients 104 can be in communication with at least one web application server 110, and one claimed web application security server 108 over network 102. Although FIG. 1 refers to web client 104 as a web client device, other types of client devices may be employed with the invention. For example, multiprocessor systems, microprocessor-based or programmable consumer electronics network PC's, PDA's, wearable computers, and the like. These client devices may also include devices that typically connect to network 100 using a wireless communications medium, e.g., mobile nodes 106, smart phones, pagers, walkie-talkies, radio frequency (RF) devices, infrared (IR) devices, integrated devices combining one or more of the proceeding devices, and the like.

Figure 2:
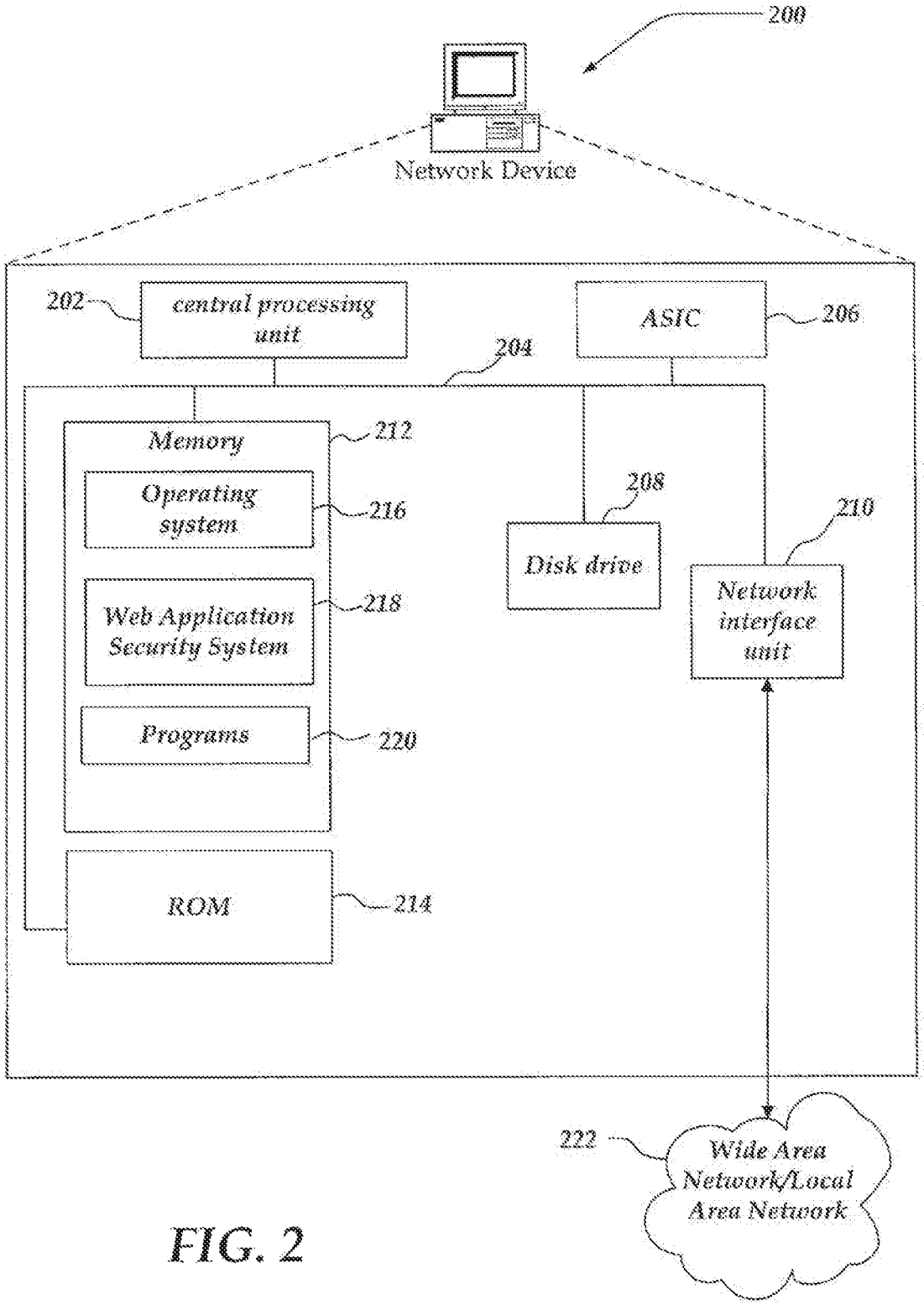
FIG. 2 illustrates a functional block diagram of one embodiment of a network device in which the invention may be practiced.

FIG. 2 illustrates a functional block diagram of an embodiment of a network device in which the invention may be practiced. It will be appreciated that not all components of network device 200 are illustrated, and that network device 200 may include more or fewer components than those shown in FIG. 2. Network device 200 may operate, for example, as a router, bridge, firewall, gateway, traffic management device, distributor, load balancer, server array controller, or proxy server. The communications may take place over a network, such as network 222, the Internet, a WAN, LAN, or some other communications network.

As illustrated in FIG. 2, network device 200 includes a central processing unit (CPU) 202, mass memory, and a network interface unit 210 connected via a bus 204. Network interface unit 210 includes the necessary circuitry for connecting network device 200 to network 222, and the like, and is constructed for use with various communication protocols including the TCP/IP and UDP/IP protocol. Network interface user 210 may include or interface with circuitry and components for transmitting messages and data over a wired and/or wireless communications medium. Network interface unit 210 is sometimes referred to as a transceiver.

The mass memory generally includes random access memory ("RAM") 212, read-only memory ("ROM") 214, and one or more permanent mass storage devices, such as hard disk drive 208. The mass memory stores operating system 216 for controlling the operation of network device 200. The operating system 216 may comprise an operating system such as UNIX, LINUX™, Windows™, and the like.

In one embodiment, the mass memory stores program code and data for implementing web application security system 218, and related program code and data, in accordance with the present invention. The mass memory may also store additional programs 220 and data for performing the functions of network device 200. Programs 200 may also include applications that are employed by web application security system 218 to handle complex, high-level protocols, including, but not limited to, compression, and Secure Socket Layer (SSL) operations on packets. In addition, programs 220 may include a web server program, reverse proxy program, and the like, that are employed by the web application security system for handling requests from web-clients and responses from web applications.

In one embodiment, the network device 200 includes one or more Application Specific Integrated Circuit (ASIC) chips 206 connected to the bus 204. As shown in FIG. 2, the network interface unit 210 may connect to the bus through an ASIC chip. The ASIC chip 206 includes logic that performs some of the functions of network device 200. For example, in one embodiment, the ASIC chip 206 performs a number of packet processing functions, to process incoming packets. In one embodiment, determined actions of web application security system 218 are performed by the ASIC chip 206, a similar hardware device, and the like. In one embodiment, the network device 200 includes one or more field-programmable gate arrays (FPGA) (not shown), instead of, or in addition to, the ASIC chip 206. A number of functions of the network device can be performed by the ASIC chip 206, by an FPGA, by the CPU 202 with the logic of program code stored in mass memory, or by a combination of the ASIC chip and the CPU.

Computer storage media may include volatile and non-volatile, removable and non-removable media implemented in any method or technology for storage of information, such as computer readable instructions, data structures, program modules or other data. Examples of computer storage media include RAM 212, ROM 214, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Network device 200 may also include an input/output interface (not shown) for communicating with external devices or users.

Network device 200 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server. Network device 200 can also be implemented as a combination of blades and additional components in the chassis.

Figure 3:
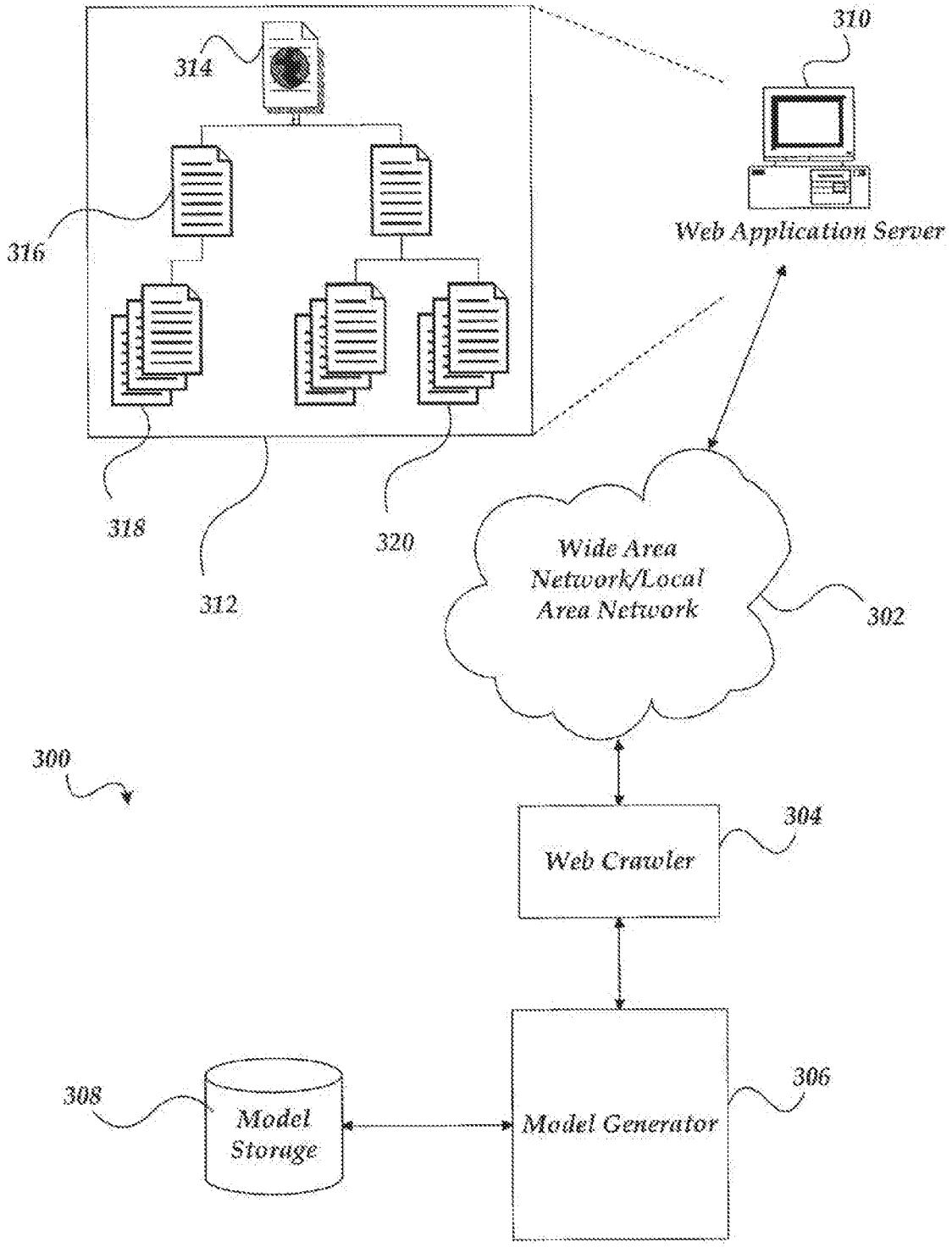
FIG. 3 illustrates one embodiment of a model generation embodiment.

FIG. 3 illustrates a functional block diagram of an embodiment of the invention configured for automated application model generation. In order to automate the application model generation the claimed invention may employ web crawler 304 that will automatically probe the target web application 312.

In one embodiment of the invention, web application server 310 may include, at least, one computer running a network operating system that may comprise operating systems such as, Windows 2000, Windows XP, Sun Solaris, Linux, UNIX, and the like. Web application servers may also employ one of a variety of web server software programs, including, but not limited to, Apache Web Server, Microsoft Internet Information Server, Apache Tomcat, IBM WebSphere, IBM Lotus Domino Server, SUN Java System Web Server, and the like. Also, the web application server computer may include a variety of additional applications and networking programs as determined by the particular needs and resources of the system owners.

As illustrated in FIG. 3, web crawler 304 may transmit HTTP requests over a network 302 to web application server 310. Web application server 310 will respond to the request from web crawler 304 by serving up web pages from target web application 312. For example, web crawler 304 may request top level web pages 314 of the web application. From parsing top web page 314, the web crawler may determine links to down-level web pages 316 and 318 and automatically make requests to fetch the contents of those pages as well. Web crawler 304 may deterministically make a request for each web page it can find in the application. Also, web crawler 304 may detect active code elements in the web page that provides multiple choices or options. For example, HTML elements such as radio button groups and select lists, and the like may be detected within a web page. Web crawler 304 may make multiple requests for the subject page until the available options on the web page have been exhausted. For example, if web crawler 304 detects a five option radio button group on a HTML form, web crawler 304 may send at least five requests to the web application server, one request for each radio button option.

Web crawler 304 may be at lest one computer program running on, at least, one computer. Web crawler 304 may request web pages from target web application 312. Web crawler 304 may examine each requested web page looking for navigation elements that can lead to other pages within the application. In general, web crawler 304 may start with at lest one URL to visit. As it visits URLs, web crawler 304 may identify the hyperlinks in the page and add them to a list of URLs to visit.

As illustrated in FIG. 3, web crawler 304 may forward the requests it makes and the subsequent responses received from web application server 310 to application model generator 306. Application model generator 306 may employ the information provided by web crawler 304 to generate an application model for the target web application. Application model generator 306 may employ the web application URL's and HTTP field values to construct the application model. The application model detail may be stored in model storage database 308 for later use.

It may be helpful to discuss the some underlying security problems inherent in a web application so that the present invention may be more fully appreciated.

FIG. 4A illustrates one embodiment of a fully rendered web page or a simple banking web application. This page 402 represents a HTML form used for transferring balances between a savings account and a checking account. The user can see his name, account name, ID, and balances 404, 406, and 408. There is also a field for entering an amount to be transferred 410. Finally, there is button 412 for submitting the form.

FIG. 4B illustrates some of the underlying HTML source 414 that makes up the form shown in FIG. 4A. Form tag 416 indicates which HTML target the form information is to be posted to when the user selects submit. Hidden fields 418 are fields that may include important application specific state information that normally is not visible to users. However, users can view the hidden fields using the "view source" feature of their web client. Hidden fields 418 may include important information such as account numbers. Field 420 is the HTML for the submit button.

Hidden fields 418 may include sensitive information that may be considered safe to send to the web client because the web application assumes that only the owner of the information will have access to the rendered form as well the underlying source code. This is a reasonable assumption since banking web applications usually require the user to login with a username and password before accessing sensitive information. In addition, the HTTP connection is likely encrypted using SSL (Secure Sockets Layer), or some similar encryption protocol, which may prevent interception of the sensitive data. Therefore, the owner/developer of the web application may not be concerned about putting sensitive data in the hidden fields of the HTML form.

FIG. 4C illustrates HTTP POST operation 422. The HTTP POST command 424 may be sent when a user selects the submit button on a HTML form. Basic command 424 includes the name of the command, "HTTP POST," followed by, at least, the URI of the target. In addition, all of the form fields are sent as a collection of (name, value) 2-tuples 426.

A security problem may arise because a malicious user can alter the values of the form fields 426, before submitting them to the web application server. This can, at least, be accomplished by using custom network programming tools such as perl, python, and java. For example, a malicious user may alter the account number fields in order to surreptitiously transfer money from another user's account. This type of malicious exploit can be challenging for web application developers to prevent since at this point the user is usually considered to be trusted.

Figure 5:
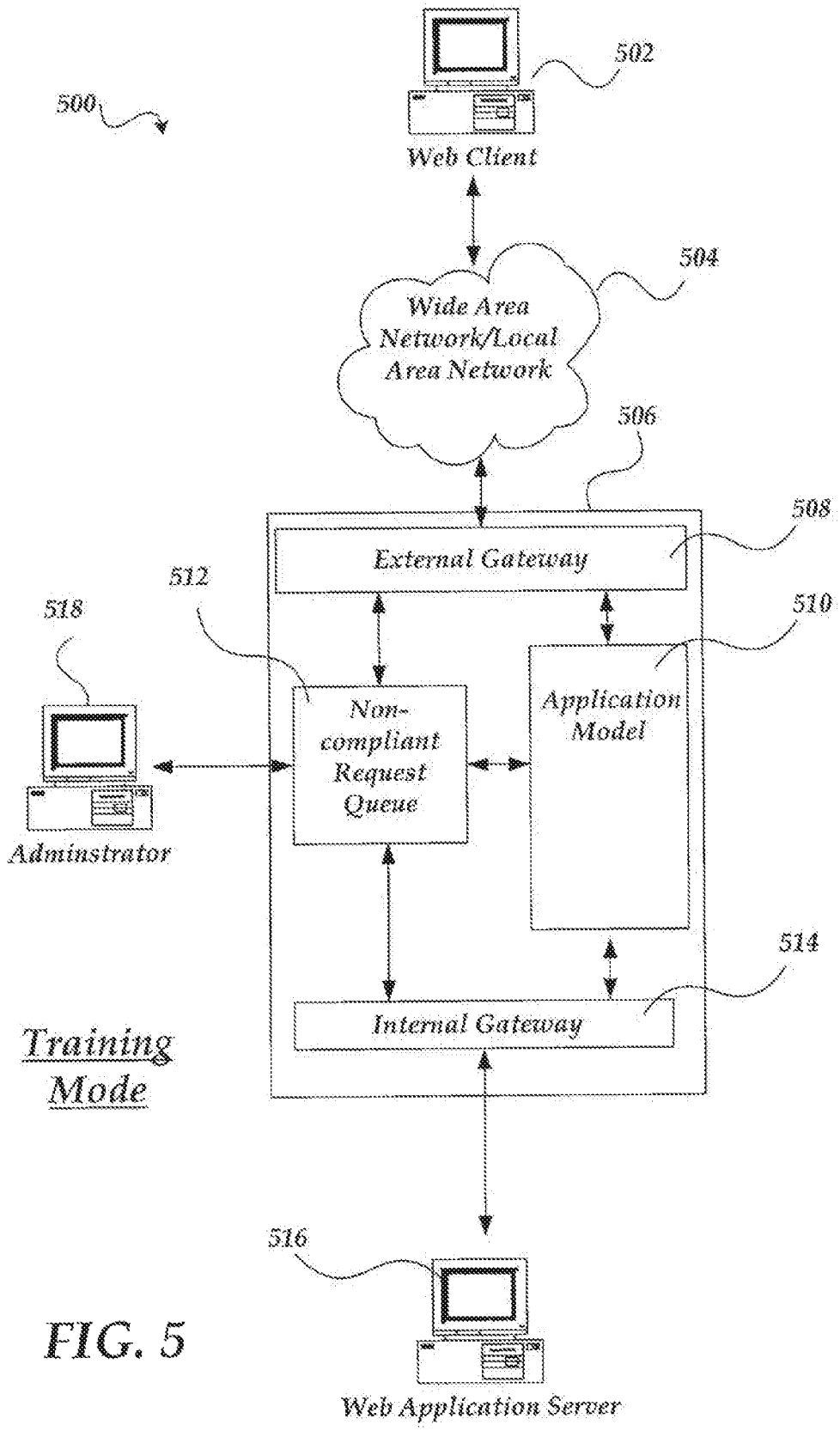
FIG. 5 illustrates an embodiment in learning mode.

FIG. 5 illustrates functional block diagram 500 of an embodiment of the invention operating in training mode. Web application security system 506 is configured to intercept incoming messages from network 504 and, also intercept outgoing messages from the web application server 516. Incoming requests from the web clients 502 may be automatically routed through web application security system 506 before they are forwarded to web application server 516. In general, web clients 502 may be unaware that the requests and responses are routed through the web application security system 506.

Incoming requests may be initially handled by external gateway 508. External gateway 508 may be employed to parse incoming requests and validate them against application model 510. Requests found to be non-compliant may be recorded in non-compliant request queue 512. Non-compliant request queue 512 may be employed to store the non-compliant requests until they can be reviewed by administrator 518. Internal gateway 514 may maintain the connections to actual web application server 516. Internal gateway 514 may, at least, intercept responses from web application server 516 to record values of form fields and query values that are sent to the web client. After processing, the web application server response may be forwarded to web client 502 that made the original request.

An embodiment may enable administrator 518 to review non-compliant request queue 512. Administrator 518 may determine which non-compliant requests should be added to the application model 510 and which requests should be discarded. Administrator 518 may be able to perform the following functions including, but not limited to, viewing lists of non-compliant request and response pairs, viewing form field data, viewing query string data, adding request/response pairs to the application model, configuring valid data types for form fields and query string values, configuring valid data ranges for form fields and query strings, and the like.

At least one embodiment of the invention may have the sub-components of web application security system 506 installed in a single computer with the sub-components implemented on software. Each sub-component may include at least one program, or entire system 506 could be implemented as single computer software program.

Another embodiment of the invention may have the sub-components of web application security system 506 installed in a single computer with one or more of the subsystems implemented in hardware and the remaining sub-components implemented by computer software programs.

At least one embodiment of the invention may have one or more, of the sub-components of the web security application system 506 installed, on one or more, separate computers. This may enable each sub-component to scale independently of the other. Such scaling may be accomplished by deploying bottleneck sub-components on additional computers. Also, an embodiment may locate sub-components in more than one physical location. Furthermore, the sub-components may be implemented in hardware or software.

Figure 6:
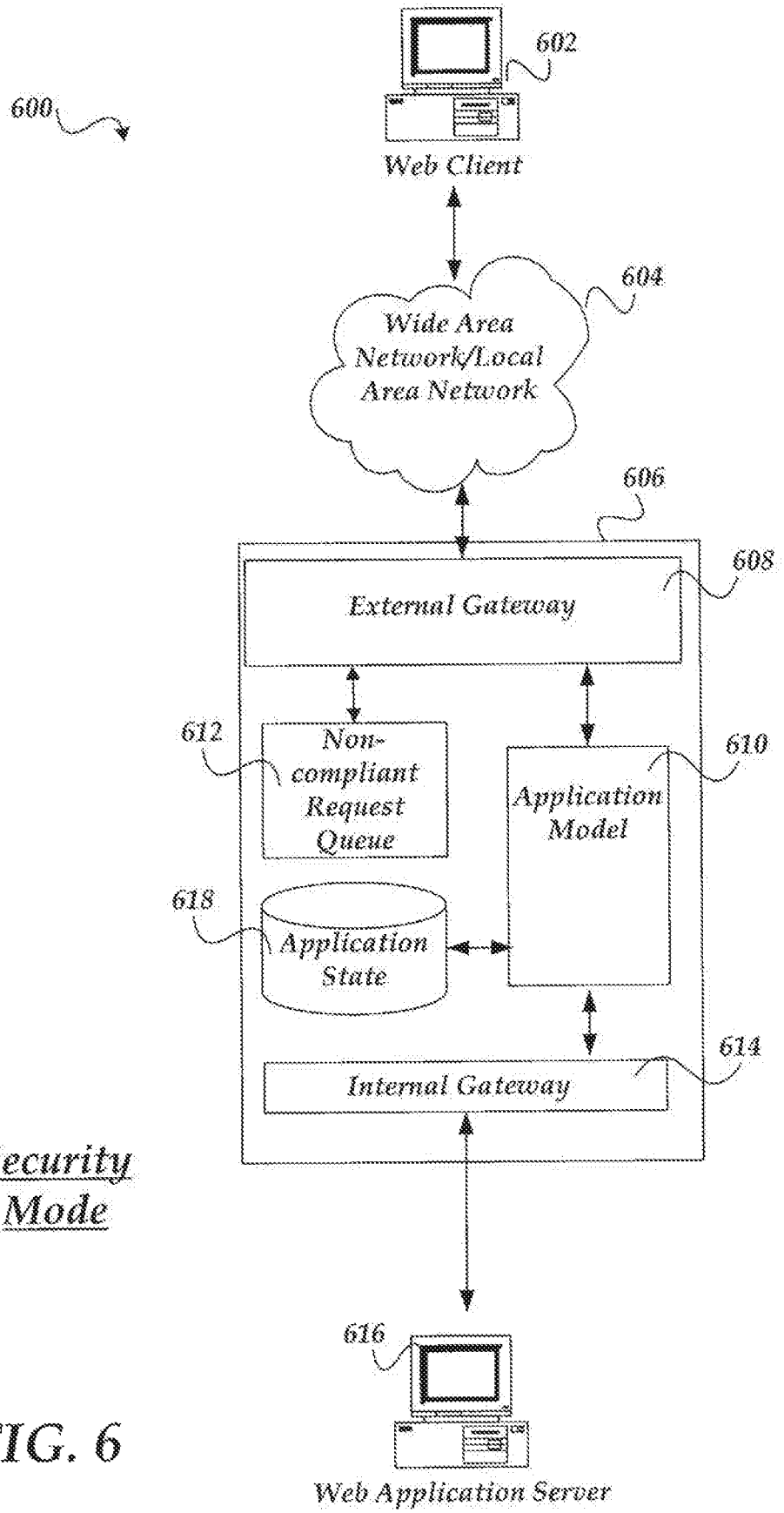
FIG. 6 illustrates an embodiment in security mode.

FIG. 6 illustrates functional block diagram 600 of an embodiment of the invention operating in security mode. Web application security system 606 may be configured to intercept incoming messages from the network 604 and outgoing messages from web application serer 616. Incoming requests from web clients 602 may be automatically routed through web application security system 606 before they are forwarded to web application server 616. In general, web clients 602 may be unaware that the requests and responses are routed through the web application security system 506.

Incoming requests may be initially handled by the external gateway 608. External gateway 608 may be employed to parse incoming requests and test them against application model 610. Requests found to be non-compliant may be recorded in non-compliant request queue 612. Non-compliant request queue 612 may be employed to store the non-compliant requests until they can be reviewed by an administrator. If a request is found to be non-compliant it may not be forwarded to internal gateway 614. Internal gateway 614 may maintain the connections to actual web application server 616. Internal gateway 614 may intercept responses from web application server 616 to record values of form fields and query values that may be sent to the web client. After the application state is recorded in application state database 618, the web application server response may be forwarded to web client 602 that made the original request.

At least one embodiment of the invention may have the sub-components of the web application security system 606 installed in a single computer with the sub-components implemented in software. Each sub-component may include at least one program, or entire system 606 could be implemented as single computer software program.

Another embodiment of the invention may have the sub-components of web application security system 606 installed in a single computer with one or more of the subsystems implemented in hardware and the remaining sub-components implemented by computer software programs.

At least one embodiment of the invention may have one or more of the sub-components of web security application system 606 installed, on one or more, separate computers. This may enable each sub-component to scale independently of the other. Also, it may enable the various sub-components to be located in more than one location. Furthermore, the sub-components may be implemented in hardware or software.

Preliminary Model Generation

The application model employed to verify and validate user requests can be generated automatically by employing, for example, a web crawler software program to probe and map the target web application. This may enable the modeling of large and complex websites for which modeling would otherwise be difficult or impossible because of the sheer size and complexity of the web application. If the web application is simple an auto-generated application model may be sufficient for production use. However, complex web applications may include additional tuning to complete a production quality application model.

Figure 7:
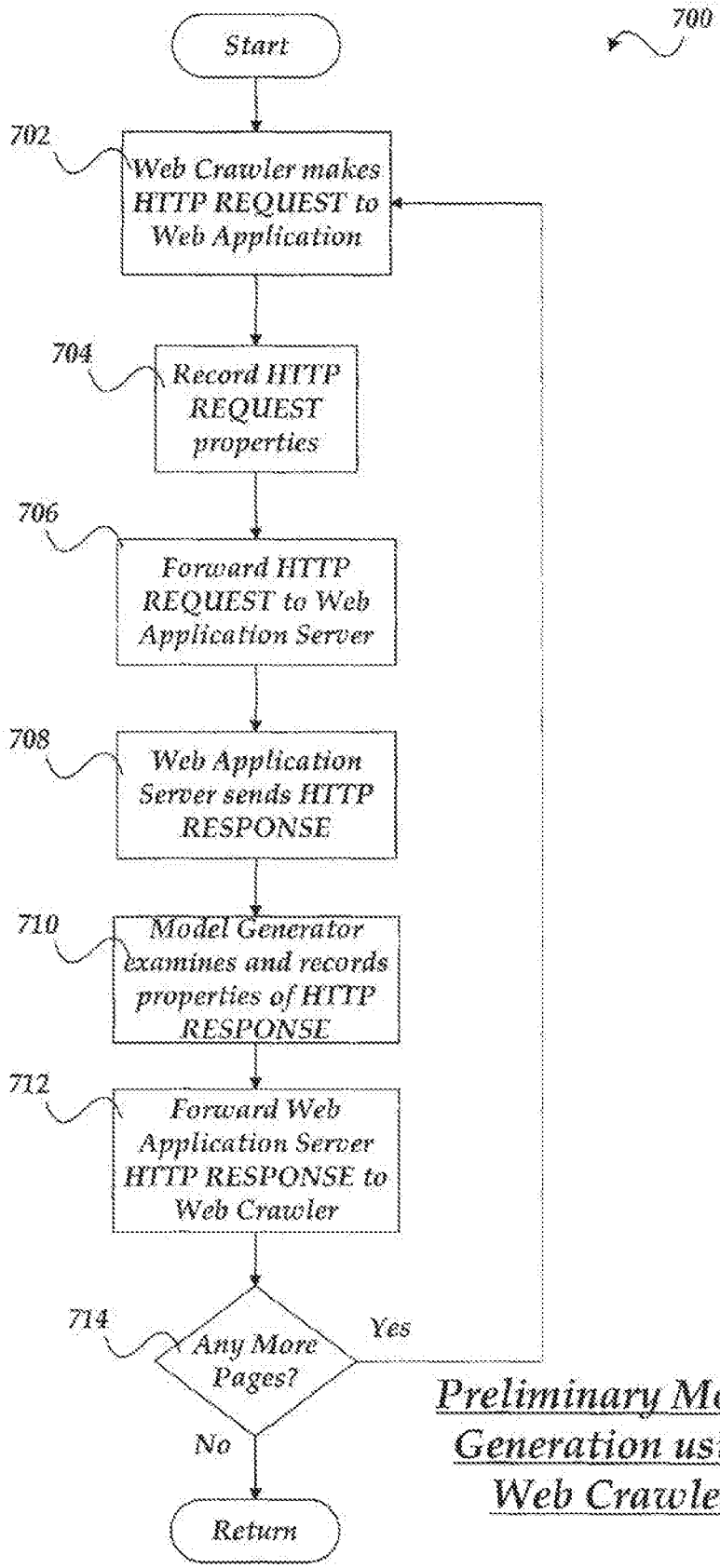
FIG. 7 shows one embodiment of a flowchart for model generation.

FIG. 7 illustrates logical flow 700 of automated model generation for an embodiment of the invention. The web crawler may be seeded with at least one Uniform Resource Locator ("URL") for the target application.

Processing begins, after a start block, at block 702 where the web crawler makes a HTTP REQUEST using the supplied URL. Processing flows next to block 704, where, before the request is forwarded to the target web application the application model may record the complete HTTP request, including, but not limited to, the URL query path, query values, cookies, meta data, and the like.

Next processing flows to block 706, where once the HTTP request data has been recorded the HTTP request may be forwarded to the web application server. The web application server may process the request as it would for any regular client request. For example, the web application may render HTML pages suitable for the requesting web user-agent. After the request has been processed, processing flows to block 708 where the web application server may send a HTTP response back to the requesting web client.

Flowing next to block 710, the web application server's response may be intercepted by the internal gateway. The intercepted HTTP response may be examined and recorded. Also, the request/response pair may be added to the preliminary application model. Processing continues to block 712, where the web application's HTTP response may be forwarded to web crawler. See also, FIG. 6.

Processing continues to decision block 714, where after receiving the response from the web application the web crawler may parse the response looking for any additional navigation paths ("links"). If at decision block 714, there are links within the web application that have not been visited by the web crawler the web crawler may select the next available link and the logic flow may loop back to block 702, where the web crawler may make another HTTP request. The processing may continue until the web crawler can find no other links to visit or an administrator intervenes and stops the mapping. In which instance, process 700 returns to a calling process to perform other actions.

Training Mode Web Client Requests

Training mode enables the detection and recording of request/response pairs that may not have been correctly mapped by the web crawler. In training mode, the web application security system may be configured so non-compliant requests are recorded and then passed through to the web application server. See FIG. 5. In training mode, users may interact with the application as they would under normal circumstances. Any requests that are not compliant with the active application model may be recorded so they can later be added to the application model. Once the training period is determined to be complete, an administrator can examine the non-compliant requests and determine if they should be added to the application model.

Figure 8:
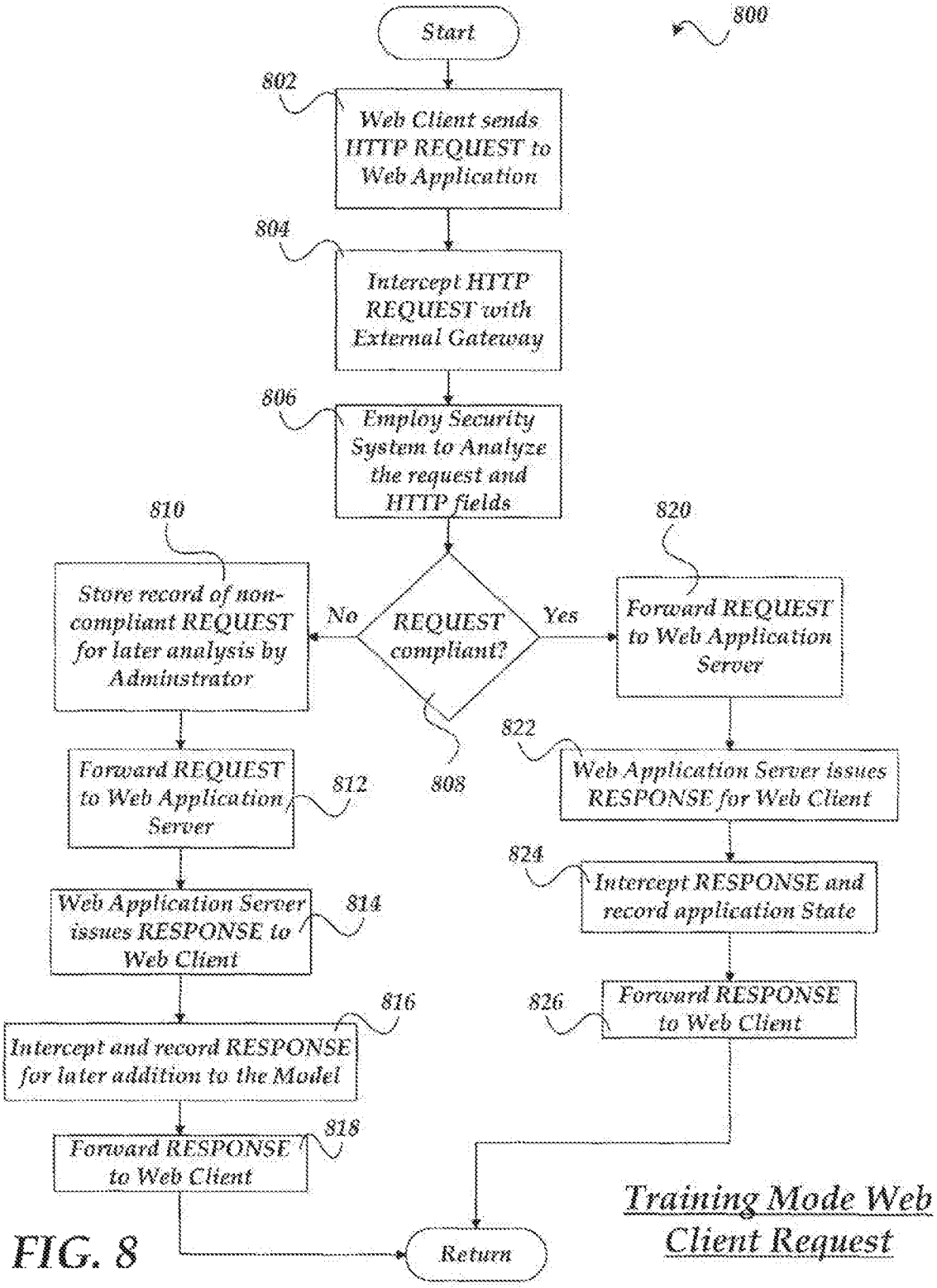
FIG. 8 shows one embodiment of a flowchart of an active mode web client requests.

FIG. 8 illustrates logical process 800 of a web client request when an embodiment of the invention is operating in training mode. Process 800 begins, after a start block, at block 802, where a web client may send a standard HTTP request to the web application. For a HTTP application, this request may typically be either a GET or POST.

Processing next flows to block 804, where the HTTP request may be intercepted by an external gateway component, such as external gateway component 508 of the web application security system of FIG. 5.

Next, processing continues to block 806, where the web application security system may examine the incoming request in order to determine if the request is compliant. A request may be considered compliant if the URL is registered in the active application model and the request is coming from a valid referring URL. Also, if an encrypted application state token is present in the request, the associated application state information may be retrieved to validate the incoming request. Application state validation may include, but is not limited to, comparing the number of form fields returned in the current request versus the number of fields sent in the previous server response, the values of the hidden fields that were sent to web client in the previous response, cookie values, session values, user-agent identification strings, and the like.

Process 800 continues to decision block 808, where if the request is deemed compliant processing branches to block 820. At block 820, the complaint requests may be allowed to continue on the web application server. Processing continues to block 822, where the web application may prepare a response to the web client's request and send it back to the web client. Continuing to block 824, the response may be intercepted by an internal gateway, such as internal gateway 514 of FIG. 5, before it is transmitted to the web client. At this point the names and values of outbound fields and parameters may be recorded to maintain a record of the application state. Processing next flows to block 826, the web application server's response may be forwarded to the requesting web client. Upon completion of block 826, processing returns to a calling process to perform other actions.

Alternatively, at block 808, requests deemed non-compliant flow to block 810, where they may be recorded in the non-compliant request queue. See also, FIG. 5, 512. Once the request has been recorded the logic flows to block 812 where the request may be forwarded to the web application server. Continuing to block 814, the web application server may form a response to the request and send it to the requesting web client.

Flowing next to block 816, the response may be intercepted and the HTTP response information may be recorded in the non-compliant request queue so it can be reviewed by an administrator. Processing continues to block 818, where the web application's response may be forwarded to the requesting web client. Upon completion of block 818, processing returns to a calling process to perform other actions.

Security Mode Web Client Requests

Security mode enables the detection, recording, and blocking of non-compliant requests. In security mode, the web application security system may be configured so non-compliant requests may be blocked before they reach the web application server. Also, requests not compliant with the active application model may be recorded so they can later be added to the application model. See FIG. 6.

Figure 9:
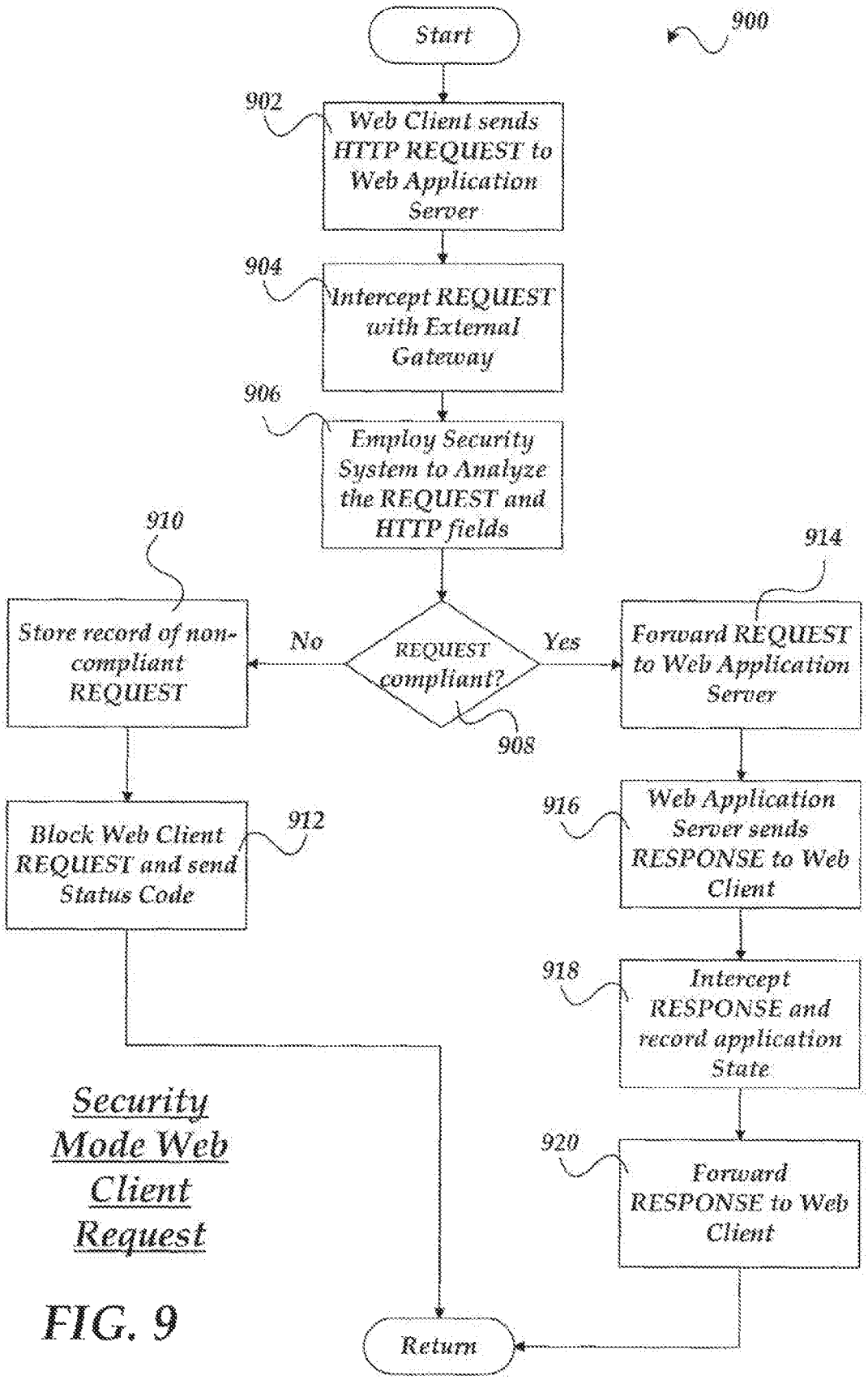
FIG. 9 shows one embodiment of a flowchart of a learning mode web client request.

FIG. 9 illustrates logical process 900 of a web client request when an embodiment of the invention is operating in security mode. Process 900 begins, after a start block, at block 902, where a web client may send a standard HTTP request to the web application. Flowing next to block 904, the HTTP request may be intercepted by an external gateway component, such as external gateway component 608 of the web application security system of FIG. 6. Next, the process continues to block 906, where the web application security system may examine the incoming request in order to determine if the request is compliant.

Flowing next to decision block 908, a determination is made whether the request is compliant. If the request is deemed complaint, processing branches to block 914, where the complaint request may be allowed to continue to the web application server. Processing continues to block 916, where the web application may prepare a response to the web client's request and send it to the web client. Flowing next to block 918, the response may be intercepted by an internal gateway, such as internal gateway 514 of FIG. 5, before the request is transmitted to the web client. At this point the names and values of outbound fields and parameters may be recorded to maintain a record of the application state. Processing next flows to block 920, where the web application server's response may be forwarded to the requesting web client. Upon completion of block 920, processing returns to a calling process to perform other actions.

Alternatively, at block 908, if the request is deemed non-compliant, processing flows to block 910, where the non-compliant request may be recorded in the non-compliant request queue. See also, FIG. 6. Once the request has been recorded the logic flows to block 912 where the invention may respond directly to the web client's non-compliant request by sending a responsive HTTP Status Code (e.g., HTTP codes 401,403, 404, and the like). Note, that the non-compliant request may be safely blocked before it reaches the web application server. Processing then returns to the calling process to perform other actions.

Tuning the Model

The present invention enables a method for tuning the application model. Administrators may review the collected non-compliant requests. If the administrator determines that a request was inadvertently omitted from application model then the administrator may add the request to application model. Non-compliant request lists may be collected during formal testing cycle(s), such as when the invention is operating in training mode. Also, non-compliant requests may be detected and recorded during normal security mode operations.

Figure 10:
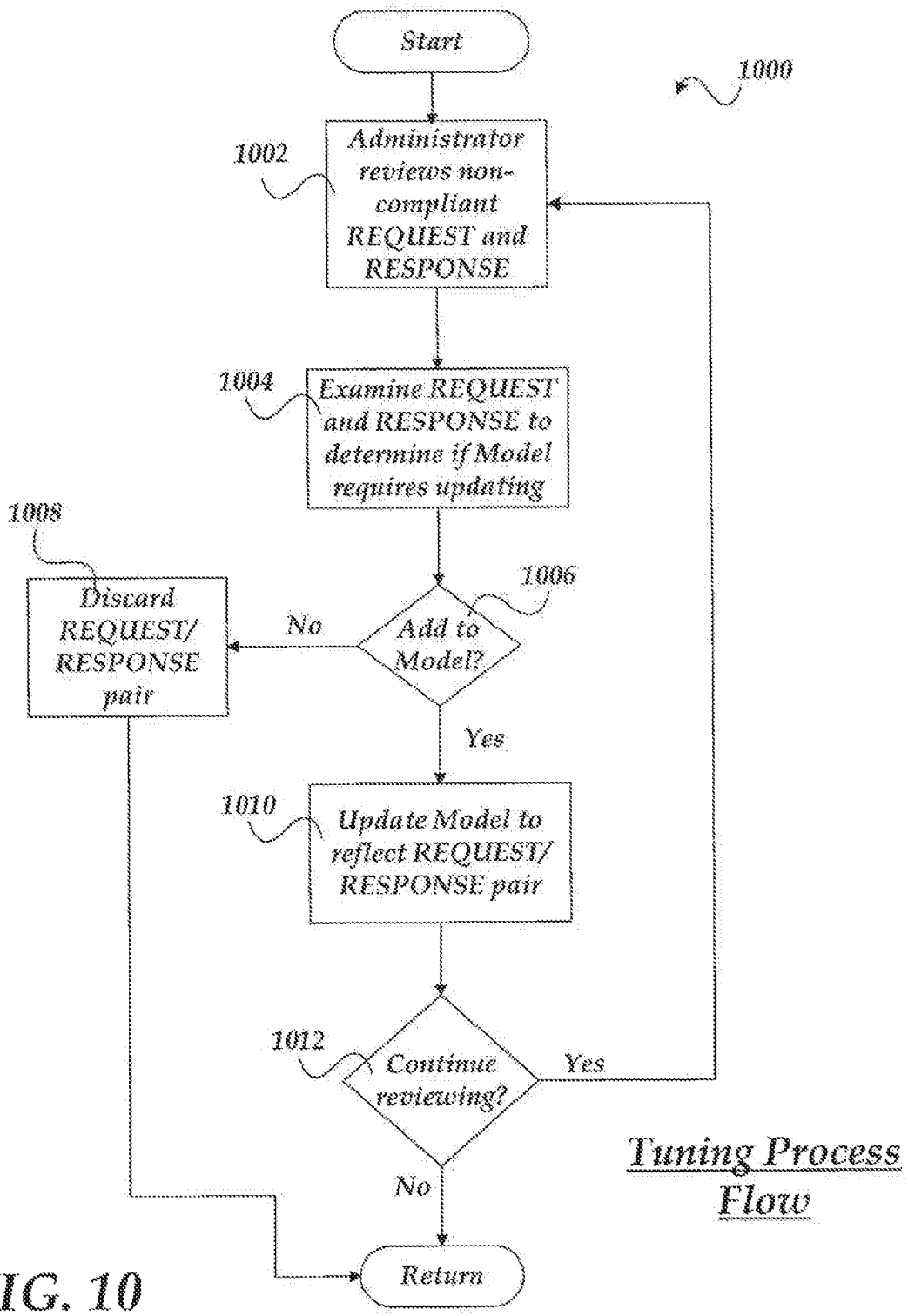
FIG. 10 shows one embodiment of logic flow of a tuning process.

FIG. 10 is a logical flowchart showing the tuning process 1000 for an embodiment of the invention. Process 1000 may be conducted, for example, by an administrator or operator of the system. The administrator is not required, or intended to be, a network administrator. However, the administrator may be familiar with the web application being tuned, to make appropriate decisions regarding the application model.

Process 1000 begins, after a start block at block 1002, where the administrator may review non-compliant requests and responses. In at least one embodiment, the administrator may view a complete list of non-compliant requests and select one to review. In another embodiment of the invention, the administrator can tune the web application security system remotely by employing a web browser. If the administrator has selected a non-compliant request to review then the process flow continues to block 1004, where the request and response pair, may be examined by the administrator to determine if they should be added to the application model.

Processing continues to decision block 1006, where if the administrator determines that the application model should be updated to include the request under reviews, the logic flows to block 1010. At block 1010, the administrator may add the request/response pair to the application model. In at least one embodiment, the administrator may have access to configuration tools that may enable defining of constraints that may be applied when an incoming request is validated by the application model. For example, certain form fields may be assigned a constraint requesting the fields to include numbers. In any event, processing continues to decision block 1012, where if there are more requests to review the logic flow may loop back to 1002. Otherwise, processing returns to a calling process to perform other actions.

Alternatively, at block 1006, if the administrator determines that the non-compliant request should not be added to the application model, the logic flows to block 1008. At block 1008, the non-compliant request may be discarded. In at least one embodiment, a particular request can be added to a do-not-record list. Non-compliant requests that may be in the do-not-record list may not be recorded in the non-compliant request queue; they may be automatically discarded without requiring review. In another embodiment of the invention, patterns and regular expressions may be employed to determine if a non-compliant request is to be automatically discarded without requiring review. Next, logic flows to decision block 1012, where if there are more requests to review the logic flow will loop back to 1002; otherwise processing returns to the calling processing to perform other actions.

Application Model

The application model may be employed as a basis for validating inbound user requests. In general, the application model may be a logical structure that maintains rules and constraints that may be used for determining whether a particular user can access a particular part of the application from another particular part of the application. The application model can also be thought of as a map that includes allowable navigation paths to get from one part of an application to another.

Once a suitable application model can be deployed the invention may prevent a user from "jumping" around within an application. The only navigation paths allowable may be ones that comply with the application model. This feature may be particularly useful for web applications where users are capable of entering the application at any point by simply typing in a URI into a web browser. For example, a web application developer may expect a user to navigate through the application starting with 'A', then moving to page 13', and finally ending on page 'C'. Unfortunately for the web application developer, the user can go to page 'B' first by simply typing the URI on page 'B' into his or her web browser. Then the user can navigate to page 'A' using the same method, and so on.

In an embodiment of the present invention those requests that comply with the application model may be allowed. In an embodiment of the invention non-compliant requests may be blocked and prevented from reaching the web application server. An embodiment of the invention may use a database to store a list of compliant referring URL's for each page/part of the web application. Then those requests that may be from an allowable referrer URL may be considered compliant. Another embodiment of the invention may use a graph data structure where the application web pages may be the vertices and the compliant links may be the edges. In this embodiment, a page/part of a web application may only be accessed if in the corresponding map model there may be a path from the vertex that represents the current page of the application to the vertex that represents the intended destination page.

Figure 11:
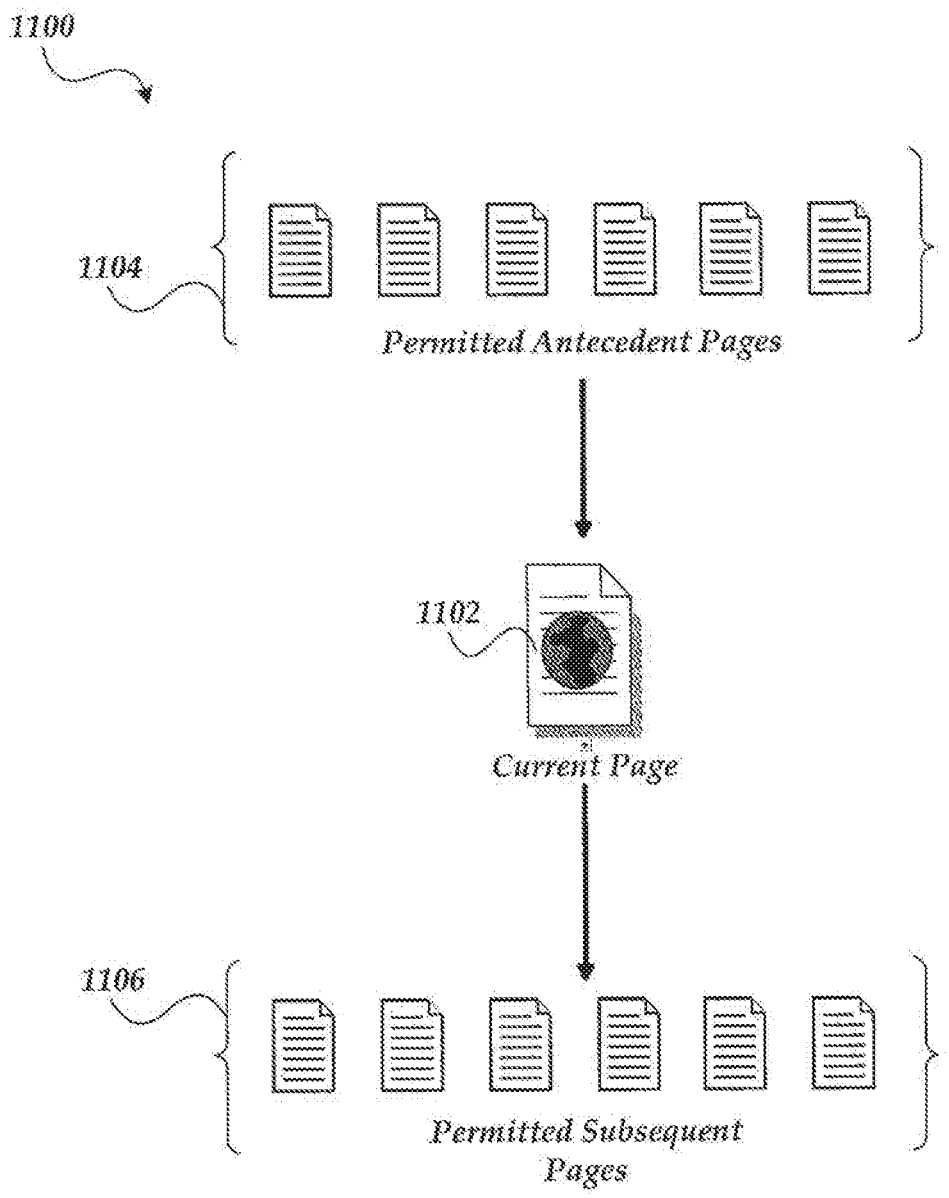
FIG. 11 illustrates one embodiment of a single page point within an application model.

FIG. 11 illustrates part of an application model for an embodiment of the invention. FIG. 1100 shows part of an application model that may be used for controlling the navigational flow for accessing particular web pages. For any given page 1102, there may be a defined set of pages 1104 from which users may be allowed to navigate to target page 1102. If the user attempts to navigate to page 1102 from a page that is not in set 1104 the user's HTTP request may be determined to be a non-compliant with the application model and subsequently blocked. Likewise, for navigation from page 1102, there may be defined pages 1106 that may accept navigation from page 1102. In other words, the set of pages 1106 may be defined by the application model as the compliant destinations for a user navigating from page 1102.

In addition to modeling how a user may navigate through the web application, at least one embodiment of the invention allows additional rules to be defined and associated with the various parts/pages of the application model. These rules can include, but are not limited to, requiring specified HTML elements to be present in the request, requiring specific form fields to be present in the request, requiring specific query string parameters to be present in the request, requiring particular values for specified form fields and query string fields to be present in the request, requiring specified form fields and query string values, and the like. Also, rules can be defined that restrict fields to include values of a particular data type, restricting specified fields to include values that match defined rules, patterns or regular expressions, and the like.

In at least one embodiment, the application model can employ the application state information to at least determine if the incoming HTTP request may include data that has been inappropriately altered.

FIG. 12 illustrates a table of an application state for an embodiment. The table 1200 may include the application state information for a plurality of users. An embodiment may have an application state table that has a column for storing the encrypted state token 1202, and one or more columns for storing the application state data 1204. Each user may have a unique encrypted state token 1206 and 1210. Encrypted state tokens 1206 and 1210 may be employed as indices to actual state data 1208 and 1212.

Encrypted state token '01Abx07sHd4W' 1206 corresponds to the data in table cell 1208. Table cell 1208 may include all of the pertinent information related to a web application server's response that was sent to a user. The data shown in cell 1208 may correspond to the web form depicted in FIG. 4A-B. The form field information has been captured and saved before the HTML depicted by FIG. 4B may be received by the client. Note that, cell 1208 includes a record of each hidden field that was sent to the web client. Also, the cell 1208 includes a place holder that may indicate that an input field named 'trxAmount' may be expecting a money value. This application state information may help prevent a user from exploiting the web application.

An embodiment may prevent exploits by examining a user's request and comparing the hidden field values sent by the user with the hidden field values recorded in the application state table. For example, when a user submits a form POST that includes encrypted state code '01Abx07sHd4W'

1206, an embodiment of the invention may be able to verify that the 'userID', 'savAcctID' , and 'chkAcctID' values 1208 are unchanged. If an embodiment detects that these fields have been altered then the request may be deemed non-compliant and subsequently blocked. The second row of table 1200, illustrates how a second user may have a unique encrypted state code 1210 that may correspond to a different application state 1212.

Figure 13:
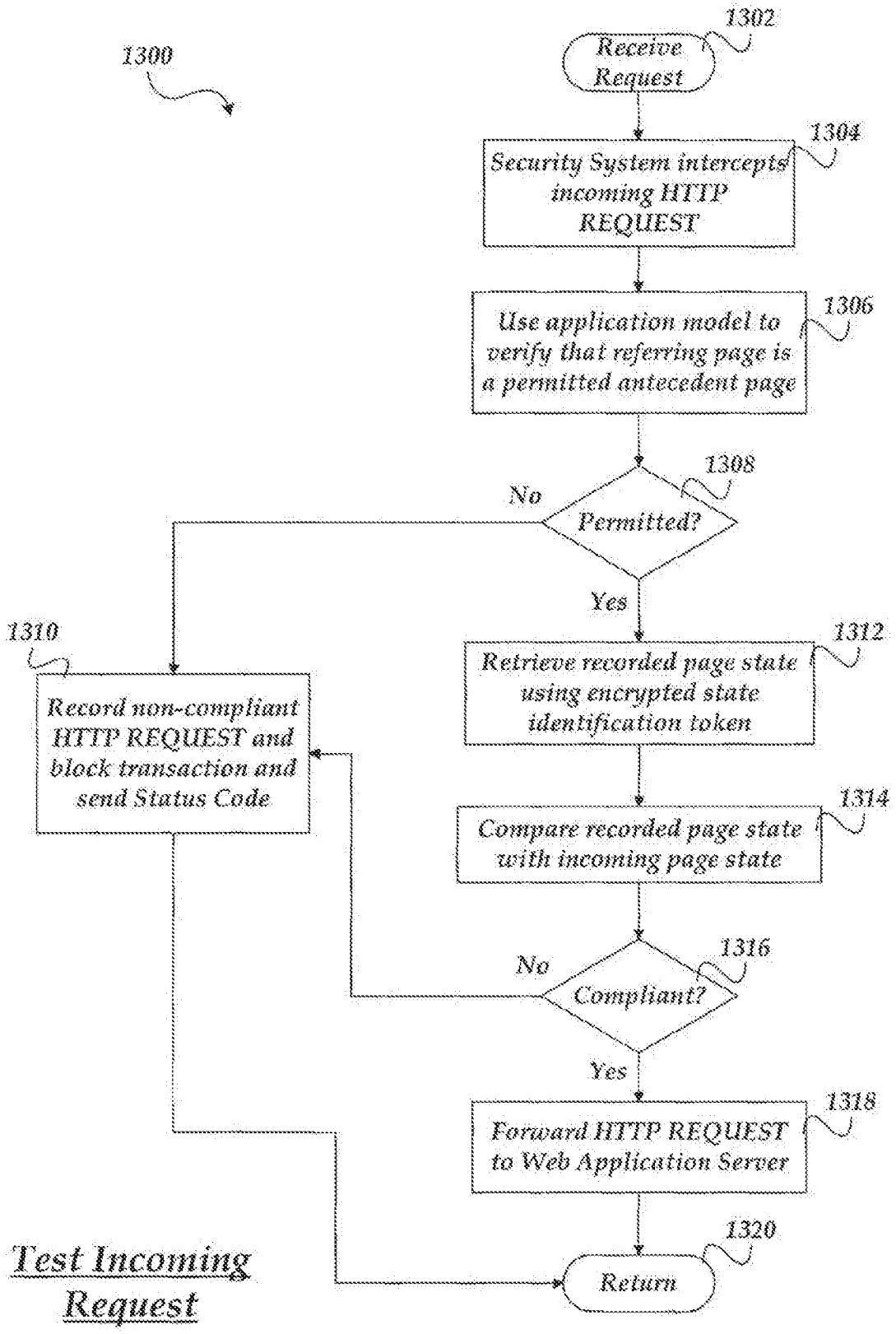
FIG. 13 shows one embodiment of a flowchart of logic to handle an incoming request.

FIG. 13 is a logical flowchart showing incoming HTTP request logic for an embodiment of the invention. The process starts at 1302 where a web client sends a HTTP request. Flowing next to block 1304, the web application security system may intercept the incoming HTTP request.

Next, the process flows to block 1306, where the application model may be employed to test if the request is coming from an allowed URL. Referring to FIG. 11, as an example, if the target of the request is page 1102 then the user should be coming from one of the pages in the set 1104 in order for the request to be compliant with the navigation rules of the application model.

Thus, moving to decision block 1308, a determination is made whether the request is complaint. If the request is compliant then the logic may flow to block 1312.

At block 1312, the application state for the request may be retrieved by using the encrypted state code that expected to be present in the web client HTTP request. If the encrypted state code is expected and is not present then the HTTP request may be blocked. If the encrypted state code is present then the corresponding application state data can be retrieved. Moving next to block 1314, the retrieved application state data may be compared to the data submitted by the user in the HTTP request.

Alternatively, at block 1308 if the navigation is not permitted, the logic flows to block 1310, where the non-compliant request may be recorded and the user's HTTP request may be blocked from reaching the web application server. The web application security system may send a responsive HTTP Status Code indicating that the request was not successful (e.g., HTTP codes 401, 403, 404, and the like).

Moving next to decision block 1316, if the data in the HTTP request is compliant with the application state then the logic flow may continue to block 1318, where the compliant HTTP request may be forwarded to the web application server for additional processing. Processing then flows to block 1320 where the process returns to a calling process.

Alternatively, at block 1316, if the data submitted in the user's HTTP request is not compliant with the application state data, the logic may flow to block 1310, where the non-compliant request may be recorded and the user's HTTP request may be blocked from reaching the web application server. The web application security system may send a responsive HTTP Status Code indicating that the request was not successful (e.g., HTTP codes 401, 403, 404, and the like).

After a user's request has been validated by the web application security system it may be forwarded to the web application server. Once the web application has processed the user's request it may formulate and transmit a response back to the user's web client. The web application security system may intercept the response in order to record the state of the application for validating subsequent user requests.

In at least one embodiment, the web application security system acts as a HTTP reverse proxy. This enables the web client's internet address to be hidden from the web application. The web application server may receive only the network addresses of the web application security system. Deploying the web application security system as a reverse proxy enables it to operate without requiring any changes or modification to the web application server.

Figure 14:
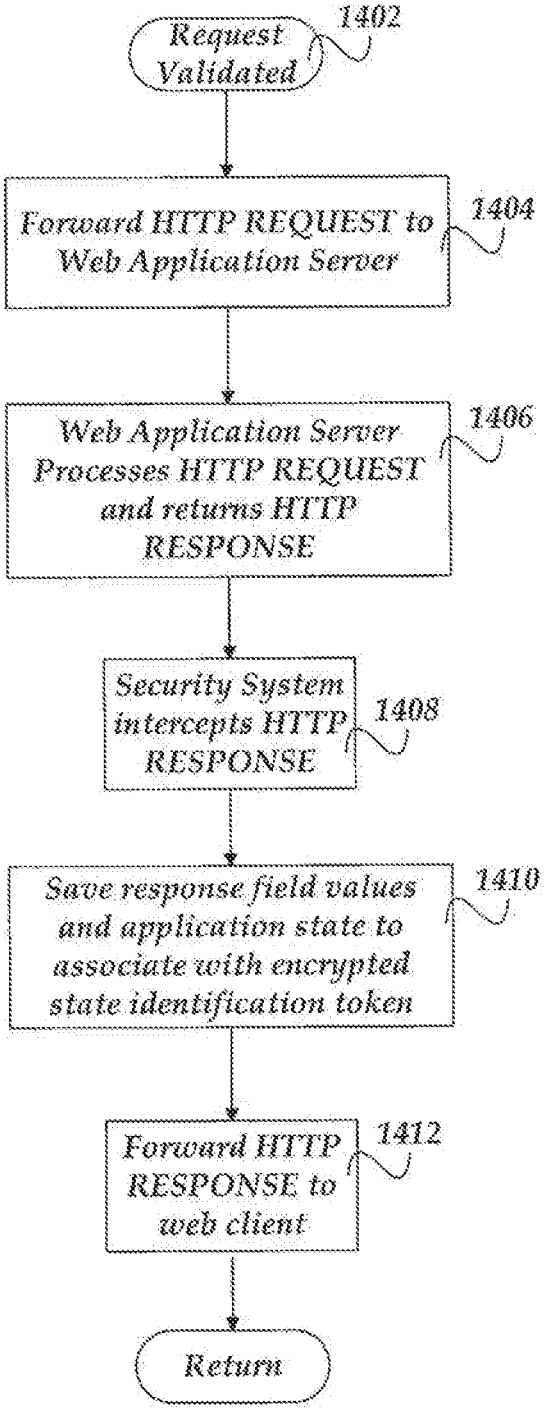
FIG. 14 shows one embodiment of a flowchart of logic to handle an outgoing response, in accordance with the invention.

FIG. 14 is a logical flowchart showing incoming HTTP response logic for an embodiment of the invention. Processing begins, after a start block, at block 1402, where the request may have been validated by the web application security system. Next, flowing to block 1404, the request may be forwarded to the web application server. Continuing to block 1406, the web application server processes the user's request and formulates and transmits a HTTP response. Continuing to block 1408, the web application security system may intercept the outbound HTTP response.

The process of FIG. 14 continues next to block 1410, where once the HTTP response has been intercepted the invention may parse the response to extract application state information. This state information may be used to validate the subsequent user requests. An embodiment may designate different kinds of information as important for validating the subsequent user requests, including, but not limited to, hidden form values, regular form fields, client-side script functions, client-side script variables, query string values, web user-agent strings, session values, cookies, and the like.

After the applicable state information has been identified and extracted from the web application server's HTTP response, an embodiment may create an identifying token that may be employed to index the state information for the outbound response. An embodiment may store the applicable application state information in a database. The encrypted state token may be employed as an index to be used for retrieving the state information. There are a multitude of ways to construct an encrypted state token and many ways to employ them to retrieve application state information.

An embodiment of the invention may create a single encrypted state token that may be active for the duration of the user's interchange with the web application. The application state associated with the token may updated for each HTTP response sent the user. An embodiment may utilize a database to provide long-term storage for the application state history. In another embodiment, the application state may be overwritten each time a response is sent to the user.

Another embodiment of the invention may create an encrypted state token that may be active only for a single response. Each time a HTTP response is intercepted by the web application security system a new encrypted state token may be constructed. Also, an embodiment may assign an expiration date/time to each encrypted state token to facilitate the detection and removal of state encrypted state tokens.

Another embodiment of the invention may create an encrypted state token that may be assigned to a user, for the lifetime of the user. An embodiment may employ the user's "account id", "user id" or another similar value as a component of the encrypted key. Another embodiment of the invention can save historical application state information for a predefined time for the user. An embodiment could use such historical information to enable auditing of sensitive systems.

In any event, processing continues to block 1412, where the HTTP response may be forwarded back to the requesting user's web client. Upon completion of block 1412, processing returns to a calling process.

Embodiments of the invention may ensure that the encrypted state token is sent back to the web application security server when the user sends HTTP subsequent requests.

An embodiment of the invention may send the encrypted state token back to the web client in a HTTP cookie. An embodiment may inject a cookie designated to include the encrypted state token into the HTTP response, in this way, cookies specific to the web application itself may not be affected by the encrypted state token.

Another embodiment of the invention may add the encrypted state token to an existing cookie that is being used by the web application. This may be appropriate, for example, if the underlying web application is using a well known cookie, such as a session cookie that may present during each response made by the web application.

Another embodiment of the invention may inject a hidden form field that includes the encrypted state token for all HTTP responses that include a form. This method may ensure that any form submitted by the user may be submitted with a field including the encrypted state token.

Another embodiment of the invention may inject the encrypted state token into the query string for all HTML links that are included in a HTTP response. For example, a web application may send the following HTML link (anchor) element in a HTTP response:

<a href "usermenu.html">View User Menu</a>

An embodiment of the invention that injects the encrypted state token into query strings may intercept and rewrite the HTML link (anchor) element as follows:

<a
href "usermenu.html/TOKEN=0CFRE4EGT6">View User Menu</a>

Embedding the encrypted state token in the query strings may ensure that the correct application state may be retrieved if the user requests the pages using a HTML link.

Another embodiment of the invention may embed the encrypted state token in all of the URL paths of the web application. For example, an embodiment could rewrite all outbound application URL's to include an additional path level that may be used to identify the encrypted state token. An embodiment could take a URL, such as:

http//www.home.net/and rewrite is as follows:

http//www.home.net/0CFRE4EGT6/Thus

Thus the encrypted state token, 0CFRE4EGT6, may be injected into the URL path of web application.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

[1. A network device for managing a communication over a network, comprising:

a transceiver configured to intercept an incoming message from a client device and an outgoing message from a server device, wherein an application resides on the server device; and a processor configured to perform actions including:

intercepting a request from the client device to the application residing on the server device for content from the application;

determining when the request for content is compliant based on a comparison of hidden fields by performing actions, comprising:

examining the request for an encrypted state token;

decrypting the encrypted state token;

extracting from the state token a hidden field;

comparing the extracted hidden field to values of hidden fields from an application state data store; and when the extracted hidden field is determined to be non-compliant based on the comparison, blocking the request from being forwarded to the application; and determining whether the request for content is compliant by comparing the request to a list of allowable complaint requests determined by a current state of the client device with the application and an application model of the application, the application model being automatically generated in part based on a probe of interactions with the application, the probe of interactions being separately generated by the network device absent use of the incoming message from the client device or a response from the server device to the incoming message to obtain responses to the probes that are used to identify at least the list of allowable compliant requests including allowable navigation paths within the application;

when the request for content is determined to be compliant based on the comparison of the request, forwarding the request for the content to the application; and when the request is determined to be non-compliant based on the comparison of the request, blocking the request from being forwarded to the application.]

[2. The network device of claim 1, wherein the processor is configured to perform actions, further including:

receiving a response to the request from the application;

storing information about selected hidden fields that are not visible within a display of the response;

forwarding the response to the client device;

receiving another request from the client device, the other request being in response to the received response;

examining the other request to determine when it includes the selected hidden fields and when the included selected hidden fields are modified from the stored selected hidden fields;

when the other request is absent of the selected hidden fields or when one of the hidden fields in modified from the stored selected hidden fields, determining that the other request is noncompliant; and when the other request is noncompliant, blocking forwarding of the other request to the application.]

[3. The network device of claim 1, wherein comparing the request further comprises:

examining the request to determine when a field within the request has been altered improperly; and when a field is determined to be altered improperly, determining that the request is noncompliant, and inhibiting forwarding of the request to the application.]

[4. The network device of claim 1, wherein the application model is tunable during a training period based on a collection of non-compliant requests obtained during the training period.]

[5. The network device of claim 1, wherein comparing the request further comprises:

examining the request for selected visible fields;

comparing values in the selected visible fields to values obtained by the network device from a prior communication to the client device from the application; and when the values in the selected visible fields are determined to be non-compliant based on the comparison, blocking the request from being forwarded to the application.]

[6. A system for managing a communication over a network, comprising:

a client device configured to provide requests and receive responses over the network;

a server device that is configured to host a network based application; and a security server device that is interposed between the client device and server device and is configured to perform actions, including:

intercepting a request from the client device to the application residing on the server device for content from the application;

selectively forwarding the request to the application based on determining that the request for content is compliant based on a comparison of the request to compliant requests that are determined from a current state of the client device with the application and an application model of the application device, the application model being automatically generated in part based on a probe of interactions with the application, the probe of interactions being separately generated from the intercepted request or a response to the intercepted request to obtain responses to the probe that are used to identify a list of allowable complaint requests usable by the application model including allowable navigation paths within the application;

intercepting the response to the request from the application on the server;

extracting values from selected fields within the response, at least one selected field being a hidden field that is not currently visible:

forwarding the response to the client device forwarding the response to the client device, wherein an extracted value is extracted from the hidden field within the response, and wherein forwarding the response further comprises:

generating an encrypted state token associated with the extracted value from the hidden field; and inserting the encrypted state token into the response:

within a hidden form field of the response, when the response includes a form;

wherein a query string of the response, when the response includes a link; or within a Uniform Resource Locator (URL) path within the response, when the response includes a URL; and receiving a second request from the client device; and selectively forwarding the second request to the application based on a comparison of information within the second request to the extracted values from the selected fields within the response.]

[7. The system of claim 6, wherein selectively forwarding the second request further comprises:

examining the second request for an encrypted state token within the hidden form field; and when a value of the state token when decrypted is determined to be different from the extracted values, blocking the second request from being forwarded to the application.]

[8. The system of claim 6, wherein extracting values from selected fields further comprises extracting values from visible fields that include a user selection from the visible field.]

[9. The system of claim 6, wherein selectively forwarding the request further comprises:

determining when a field within the request is improperly modified based on information stored from a prior response to the client device from the application; and when the field is determined to be improperly modified, blocking the forwarding of the request to the application.]

[10. The system of claim 6, selectively forwarding the request further comprise:

extracting from a state token within the request a hidden field value;

comparing the extracted hidden field value to a value of hidden fields from an application state data store; and when the extracted hidden field value is determined to be non-compliant based on the comparison, blocking the request from being forwarded to the application.]

[11. A non-transitory machine readable storage medium that is configured to store instructions and data that when installed on a machine that is interposed between a client device and a server device enable the machine to perform actions, including:

intercepting a request from the client device to the application residing on the server device for content from the application;

selectively forwarding the request for content to the application based on determining that the request is compliant based on a comparison of the request to allowable requests determined by a current state of the client device with the application and a model of the application; device, the model being automatically generated in part based on probe interactions with the application, the probe of interactions being separately generated by the machine absent use of the intercepted request or a response to the intercepted request to obtain responses to the probe that are used to identify at least the list of allowable compliant requests usable to generate the model including allowable navigation paths within the application;

intercepting the response to the request from the application hosted on the server extracting values from selected fields within the response, the selected fields including at least one hidden field that is not visible;

forwarding the response to the client device, wherein an extracted value is extracted from the hidden field within the response, and wherein forwarding the response further comprises:

generating an encrypted state token associated with the extracted value from the hidden field; and inserting the encrypted state token into the response:

within a hidden form field of the response, when the response includes a form;

within a query string of the response, when the response includes a link; or within a Uniform Resource Locator (URL) path within the response, when the response includes a URL; and receiving a second request from the client device; and selectively forwarding the second request to the application based on a comparison of information within the second request to the extracted values from the selected fields within the response.]

[12. The non-transitory machine readable storage medium of claim 11, wherein selectively forwarding the request further comprises:

determining when a field within the request is improperly modified based on information stored from a prior response to the client device from the application; and when the field is determined to be improperly modified, blocking the forwarding of the request to the application.]

[13. The non-transitory machine readable storage medium of claim 11, wherein the selected fields comprises at least one visible field.]

[14. The non-transitory machine readable storage medium of claim 11, wherein the selected fields includes a visible field having at least one user selectable option provided by the application.]

[15. The non-transitory machine readable storage medium of claim 14, wherein selectively forwarding further comprises: comparing the user selectable option provided by the application to a provided user selected option in the second request, and when the provided user selected option in the second request is determined to be inconsistent with the user selectable option provided by the application, blocking forwarding of the second request to the application.]

[16. The non-transitory machine readable storage medium of claim 11, wherein the model is automatically generated by:

examining a set of test requests to the application;

monitoring responses to the test requests;

recording the test requests, monitored responses, and a current state of another client device with the application based on a sequence of test requests; and identifying a set of allowable requests for a given state of the other client device with the application based on the test requests and monitored responses.]

*17. A network device for managing communication over a network, comprising:*

*a transceiver configured to be capable of intercepting an incoming message from a client device and an outgoing message from a server device, wherein an application resides on the server device; and*

*one or more processors configured to be capable of performing actions, including:*

*intercepting a request in an incoming message, from the client device to the application residing on the server device, for content from the application;*

*automatically generating an application model of the application in part based on a probe of interactions with the application, the probe of interactions being separately generated by the network device without employing the incoming message or a response from the server device to the incoming message to obtain responses to the probes, wherein the probe responses are used to identify at least a list of allowable compliant requests including allowable navigation paths within the application, and wherein the list is based in part on a current state of the client device with the application and the application model;*

*determining that the request for content is compliant based on a comparison of information in the request with the application model of the application by performing actions, comprising:*

*examining the request for a protected state token;*

*unprotecting the protected state token;*

*extracting a first value from the unprotected state token;*

*comparing the extracted first value to data in an application state data store, or comparing the request to the list of allowable compliant requests, to indicate that the request is either compliant or non-compliant with the application model; and*

*forwarding the request for the content to the application based on the request being compliant with the application model;*

*blocking the request from being forwarded to the application based on the request being non-compliant with the application model;*

*operating the application in a training mode that records one or more requests for content from the application that are determined to be non-compliant; and*

*adding the one or more non-compliant requests to the application model.*

*18. The network device of claim 17, wherein the protected state token is encrypted and the unprotected state token is unencrypted.*

*19. The network device of claim 17, wherein the one or more processors are further configured for blocking the non-compliant request further comprises one of recording the non-compliant request, or discarding the non-compliant-request.*

*20. The network device of claim 17, wherein the one or more processors are further configured for blocking the request further comprises responding to the request with an indication that the request was unsuccessful.*

*21. The network device of claim 17, wherein the one or more processors are further configured for actions further comprising employing one or more of a pattern or a regular expression to automatically identify each non-compliant request that is to be discarded without being reviewed.*

*22. The network device of claim 17, wherein the probe of interactions is automatically performed by one or more software programs.*

*23. The network device of claim 17, wherein the application model is employed to control a flow of the navigation paths to one or more defined pages.*

*24. A system for managing communication over a network, comprising: a client device that is configured to capable of providing requests and receive responses over the network;*

*a server device that is configured to be capable of hosting a network based application; and*

*a security server device that is configured to be capable of performing actions, including:*

*intercepting a request in an incoming message, from the client device to the application residing on the server device, for content from the application;*

*automatically generating an application model of the application in part based on a probe of interactions with the application, the probe of interactions being separately generated by the network device without employing the incoming message or a response from the server device to the incoming message to obtain responses to the probes, wherein the probe responses are used to identify at least a list of allowable compliant requests including allowable navigation paths within the application, and wherein the list is based in part on a current state of the client device with the application and the application model;*

*determining that the request for content is compliant based on a comparison of information in the request with the application model of the application by performing actions, comprising:*

*examining the request for a protected state token;*

*unprotecting the protected state token;*

*extracting a first value from the unprotected state token;*

*comparing the extracted first value to data in an application state data store, or comparing the request to the list of allowable compliant requests, to indicate that the request is either compliant or non-compliant with the application model; and*

*forwarding the request for the content to the application based on the request being compliant with the application model;*

*blocking the request from being forwarded to the application based on the request being non-compliant with the application model;*

*operating the application in a training mode that records one or more requests for content from the application that are determined to be non-compliant; and*

*adding the one or more non-compliant requests to the application model.*

*25. The system of claim 24, wherein the protected state token is encrypted and the unprotected state token is unencrypted.*

*26. The system of claim 24, wherein the one or more processors are further configured for blocking the non-compliant request further comprises one of recording the non-compliant request, or discarding the non-compliant request.*

*27. The system of claim 24, wherein the one or more processors are further configured for blocking of the non-compliant request further comprises responding to the request with an indication that the request was unsuccessful.*

*28. The system of claim 24, wherein the one or more processors are further configured for actions further comprising employing one or more of a pattern or a regular expression to automatically identify each non-compliant request that is to be discarded without being reviewed.*

*29. The system of claim 24, wherein the probe of interactions is automatically performed by one or more software programs.*

*30. The system of claim 24, wherein the application model is employed to control a flow of the navigation paths to one or more defined pages.*

*31. A non-transitory machine readable storage medium that is configured to store instructions and data for managing communication over a network, wherein when the instructions and data are installed on a computer that is enabled to execute the instructions to perform actions, comprising:*

*intercepting a request in an incoming message, from a client device to an application residing on a server device, for content from the application;*

*automatically generating an application model of the application in part based on a probe of interactions with the application, the probe of interactions being separately generated by the network device without employing the incoming message or a response from the server device to the incoming message to obtain responses to the probes, wherein the probe responses are used to identify at least a list of allowable compliant requests including allowable navigation paths within the application, and wherein the list is based in part on a current state of the client device with the application and the application model;*

*determining that the request for content is compliant based on a comparison of information in the request with the application model of the application by performing actions, comprising:*

*examining the request for a protected state token;*

*unprotecting the protected state token;*

*extracting a first value from the unprotected state token;*

*comparing the extracted first value to data in an application state data store, or comparing the request to the list of allowable compliant requests, to indicate that the request is either compliant or non-compliant with the application model; and*

*forwarding the request for the content to the application based on the request being compliant with the application model;*

*blocking the request from being forwarded to the application based on the request being non-compliant with the application model;*

*operating the application in a training mode that records one or more requests for content from the application that are determined to be non-compliant; and*

*adding the one or more non-compliant requests to the application model.*

*32. A method for managing communication over a network, wherein a computer that is configured to enable execution of the method, performs actions, comprising:*

*intercepting a request in an incoming message, from a client device to an application residing on a server device, for content from the application;*

*automatically generating an application model of the application in part based on a probe of interactions with the application, the probe of interactions being separately generated by the network device without employing the incoming message or a response from the server device to the incoming message to obtain responses to the probes, wherein the probe responses are used to identify at least a list of allowable compliant requests including allowable navigation paths within the application, and wherein the list is based in part on a current state of the client device with the application and the application model;*

*determining that the request for content is compliant based on a comparison of information in the request with the application model of the application by performing actions, comprising:*

*examining the request for a protected state token;*

*unprotecting the protected state token;*

*extracting a first value from the unprotected state token;*

*comparing the extracted first value to data in an application state data store, or comparing the request to the list of allowable compliant requests, to indicate that the request is either compliant or non-compliant with the application model; and*

*forwarding the request for the content to the application based on the request being compliant with the application model;*

*blocking the request from being forwarded to the application based on the request being non-compliant with the application model;*

*operating the application in a training mode that records one or more requests for content from the application that are determined to be non-compliant; and*

*adding the one or more non-compliant requests to the application model.*

* * * * *